US012126974B2

(12) United States Patent
Riedel

(10) Patent No.: US 12,126,974 B2
(45) Date of Patent: Oct. 22, 2024

(54) BELT-PACK

(71) Applicant: RIEDEL Communications International GmbH, Wuppertal (DE)

(72) Inventor: Thomas Riedel, Wuppertal (DE)

(73) Assignee: RIEDEL COMMUNICATIONS INTERNATIONAL GMBH, Wuppertal (DE)

(*) Notice: Subject to any disclaimer, the term of this patent is extended or adjusted under 35 U.S.C. 154(b) by 0 days.

(21) Appl. No.: 15/851,834

(22) Filed: Dec. 22, 2017

(65) Prior Publication Data

US 2018/0288527 A1 Oct. 4, 2018

(30) Foreign Application Priority Data

Mar. 28, 2017 (DE) ........................ 102017106668.3
Jul. 17, 2017 (DE) ........................ 102017116002.7

(51) Int. Cl.

| | |
|---|---|
| ***H04R 3/12*** | (2006.01) |
| ***H04R 1/02*** | (2006.01) |
| ***H04R 1/08*** | (2006.01) |
| ***H04R 27/00*** | (2006.01) |
| *H04R 1/10* | (2006.01) |

(52) U.S. Cl.

CPC ............... *H04R 3/12* (2013.01); *H04R 1/025* (2013.01); *H04R 1/08* (2013.01); *H04R 27/00* (2013.01); *H04R 1/1008* (2013.01); *H04R 2201/107* (2013.01); *H04R 2420/03* (2013.01); *H04R 2420/07* (2013.01); *H04R 2420/09* (2013.01)

(58) Field of Classification Search

CPC combination set(s) only.
See application file for complete search history.

(56) References Cited

U.S. PATENT DOCUMENTS 3,743,300 A * 7/1973 Johnson ................. G11B 23/06 369/259
4,374,301 A 2/1983 Leonard, Jr.
5,388,155 A * 2/1995 Smith .................... H04B 1/385 379/426

(Continued)

FOREIGN PATENT DOCUMENTS

DE 2641660 A1 3/1978
DE 20105692 U1 10/2001

(Continued)

OTHER PUBLICATIONS

Anchor Communications, PortaCom Owner's Manual, 100-0081-000/Revision A, Feb. 1998, pp. 2 (Year: 1998).*

(Continued)

*Primary Examiner* — Duc Nguyen
*Assistant Examiner* — Assad Mohammed
(74) *Attorney, Agent, or Firm* — Andrew Wilford

(57) ABSTRACT

The invention relates, among others, to a mobile terminal portable by a user (32) and designed as a belt pack (10) for use in an intercom network (17), comprising a housing (44) with a port (16) for a headset (11) with a headset microphone (13) and a headset loudspeaker (12), and further comprising a communication module (25*a*), with which audio information can be wirelessly transmitted to other users (19*a*, 19*b*) of the intercom network. The specialty consists, among others, in that a microphone (27) and a loudspeaker (28) are provided in or on the housing (44).

13 Claims, 4 Drawing Sheets

(56) References Cited

U.S. PATENT DOCUMENTS

| | | | | |
|---|---|---|---|---|
| 6,041,243 | A | 3/2000 | Davidson | |
| 6,522,765 | B1 * | 2/2003 | Towle | H04R 1/1033 381/384 |
| 6,937,724 | B1 * | 8/2005 | Kozdon | G06F 3/16 379/201.04 |
| 7,082,314 | B2 | 7/2006 | Farmer | |
| 7,120,388 | B2 | 10/2006 | Hall | |
| 7,236,600 | B1 * | 6/2007 | Bonneville | H03F 3/68 381/105 |
| 9,693,328 | B1 * | 6/2017 | Call | H04B 7/26 |
| 2002/0059420 | A1 * | 5/2002 | Lin | G08G 1/20 709/224 |
| 2003/0092453 | A1 * | 5/2003 | Mills | H04M 1/72513 455/463 |
| 2003/0176194 | A1 * | 9/2003 | Farmer | H04W 84/16 455/456.6 |
| 2004/0023688 | A1 * | 2/2004 | Bazarjani | H04M 1/724 455/557 |
| 2004/0116071 | A1 * | 6/2004 | Hall | H04M 1/05 455/3.05 |
| 2005/0026568 | A1 * | 2/2005 | Hawker | H04M 1/6041 455/70 |
| 2007/0142942 | A1 * | 6/2007 | Hyatt | H04M 1/6066 381/74 |
| 2009/0258599 | A1 * | 10/2009 | Basine | H04B 1/034 455/41.3 |
| 2010/0080084 | A1 * | 4/2010 | Chen | G01S 11/14 367/118 |
| 2010/0260247 | A1 * | 10/2010 | Albiston | H04B 3/548 375/222 |
| 2011/0158430 | A1 * | 6/2011 | Dicks | H03G 3/341 381/104 |
| 2013/0010657 | A1 | 1/2013 | Hannosh et al. | |
| 2014/0017955 | A1 * | 1/2014 | Lo | H01R 13/703 439/668 |
| 2014/0017995 | A1 * | 1/2014 | Robertson | H04B 5/0062 455/41.1 |
| 2015/0139428 | A1 * | 5/2015 | Reining | H04R 3/00 381/55 |
| 2015/0358715 | A1 * | 12/2015 | Macours | H04R 1/1041 381/74 |
| 2016/0080552 | A1 * | 3/2016 | Keating | G06F 1/1686 455/550.1 |
| 2017/0245118 | A1 * | 8/2017 | Hong | H04W 4/06 |

FOREIGN PATENT DOCUMENTS

| | | | | |
|---|---|---|---|---|
| DE | 102007009816 | A1 | 9/2008 | |
| EP | 1482716 | A1 | 12/2004 | |
| WO | 2006055884 | A | 5/2006 | |
| WO | WO-2017157905 | A1 * | 9/2017 | H04M 1/725 |

OTHER PUBLICATIONS

Clear-Com FreeSpeak II User Guide, Part No. 399G169 Rev B, Apr. 27, 2016, pp. 1-106 (Year: 2016).*

"https://de.wikipedia.org/w/index.php?title=XLR&oldid=165456468".

Produkte von Amazon; "Funkgeraete mit Headset"; Apr. 5, 2016.

* cited by examiner

BELT-PACK

FIELD OF THE INVENTION

The invention relates to a belt pack portable by a user for use in an intercom network.

BACKGROUND OF THE INVENTION

Such belt pack typically has a housing with a port for a headset with a headset microphone and a headset loudspeaker. A communication module can transmit audio information wirelessly to other users intercom network.

A belt pack in terms of this patent application is a mobile terminal that can be used in an intercom network. Such a belt pack can be carried by a user and in particular comprises a means that can attach the belt pack in a simple way to a belt of an operator. The belt pack is portable without problems, and is to is this end compact and handy. It serves to provide wireless duplex audio communication with other users of the intercom network. Duplex operation is understood to mean that talking and listening is possible simultaneously. To this end the belt pack comprises a port for a headset. The headset in principle comprises a microphone and a loudspeaker.

An operator can attach the belt pack to a belt, but also to a trouser pocket for example or another part of his clothing, and with the headset connected is able to talk and listen without using his hands. With the aid of a communication module provided inside the building the belt pack provides a wireless link to other users of the intercom network.

Intercom networks of this kind are for example temporarily established, in particular used, at large-scale events such as music or drama or sports events.

Mobile terminals, or belt packs, as described above have been developed and manufactured by the applicant for a long time.

OBJECT OF THE INVENTION

Based on a mobile terminal as described above, for which proof of a written publication cannot be furnished, it is the object of the invention to further develop this terminal in such a way that operation is rendered more comfortable.

SUMMARY OF THE INVENTION

This requirement is solved by the invention in that the housing has a microphone and a loudspeaker provided on the housing.

The principle of the invention consists in that an additional microphone and an additional loudspeaker are integrated in the belt pack. Via the microphone and the loudspeaker an operator can conduct an audio communication with other users of the intercom network.

Thus the belt pack can for example be used in a talking and listening mode without the headset being connected to the belt pack. But the option exists to operate the microphone and loudspeaker combination in addition to the connected headset.

At large-scale events, which for example can continue for several hours, different operators have a break from time to time. For example, in order to be able to remove the headset during this break but nevertheless participate in the audio communication, the microphone integrated in the housing and the loudspeaker integrated in the housing can be activated, i.e. switched on or connected as required. For example the belt pack can be placed on the break time table and allows the participants—while they are having a break—to conduct an audio communication with other users of the intercom network without the need for connecting and/or using the headset.

The invention relates to a mobile terminal for use in an intercom network. An intercom network according to the present patent application is understood to be a network via which audio information is transmitted in a so-called changeover mode, or duplex mode. This network may for example comprise one or more stationary users, so-called intercom stations, and/or for example one or more mobile users, e.g. belt packs or mobile microphones. The intercom network may also comprise one or more switching centers as well as repeaters, antennae or the like.

State-of-the art intercom networks stemming from the applicant have for example been described in the patent applications DE 10 2014 011 963 A1, DE 10 2016 123 966 A1 and DE 10 2016 123 968 A1. Reference is made explicitly to these patent applications also for the purpose of including one or more characteristics in the content of the present patent application.

The mobile terminal according to the invention can be used in such an intercom network. It can be carried by a user in the conventional way and is configured as a belt pack. In particular the name belt pack is given to a terminal attachable to a belt of an operator that for example comprises dimensions of a magnitude of 5 cm×10 cm×15 cm.

The mobile terminal comprises a housing which in particular may consist of plastic. The housing has a port for a headset. The name headset is given to a combination of a headset microphone and a headset loudspeaker, wherein this combination can be worn by the operator. As a rule the headset is provided with a cable which has a plug fitted at the end thereof. The belt pack may have a port which is configured as a socket and which serves to receive this plug.

The belt pack according to the invention moreover includes a communication module. The communication module permits a wireless transmission of audio information to other users of the intercom network. This transmission is bi-directional so that the communication module provided on the belt pack can also receive audio information from other users of the intercom network.

In particular the communication module can build a radio path with another subscriber of the intercom network, such as with a switching center or an antenna. The radio path can operate in particular according to the DECT protocol. Alternatively to the DECT protocol other frequency ranges may be provided, for example the frequency bands VHF, UHF, 2.4 GHz or 5.8 GHz.

Insofar as the DECT protocol is mentioned in terms of this patent application, this exemplary frequency band is to be understood in all instances as being merely an example for all feasible frequency bands covered by the invention.

According to the invention a microphone and a loudspeaker are provided on the housing. In particular the invention includes a case in which the microphone and the loudspeaker are integrated in the housing.

Further advantageously provision is made that the microphone and the loudspeaker do not, under any circumstance, protrude to the outside beyond an enveloping contour of the housing. An integration of the microphone and the loudspeaker with the housing or in the housing may for example be implemented in a way, as is traditionally known from other devices, for example from radio-telephones such as walkie-talkies.

According to one advantageous design of the invention the housing is provided with at least one switch. The switch, for example a programmable switch, may be integrated in the housing.

The microphone or the loudspeaker may be switched on or off by means of the switch. In particular, direct or indirect actuation of the switch may be effected by the operator. In this context it is recommended to design the switch as a contact or pressure switch.

The invention further covers the case in which the switch is programmable and/or responsive via a configuration means. The configuration means may for example comprise one or more programmable keys. For example configuration of the switch may be effected by inserting a microprocessor into the circuit.

According to a first configuration state of the switch the microphone and the loudspeaker are always switched on.

According to another possible configuration of the switch provision may be made for the microphone and the loudspeaker to be always switched on or always switched off, when a headset is connected to the belt pack via the port.

A further possible third configuration finally may comprise the possibility that the microphone and the loudspeaker are always switched off when the headset is connected to the belt pack via the port. To this end a switch for example may be actuated due to the interaction between a plug at the end of the cable of the headset and a port on the belt pack formed e.g. as a socket.

According to a further advantageous design of the invention, following actuation of the switch the microphone may be connected in parallel to the headset microphone and/or the loudspeaker may be connected in parallel to the headset loudspeaker. This offers the possibility to operate the microphone and the loudspeaker in parallel. This means in particular that it is then not necessary to detach the headset from the belt pack in order to activate the microphone and the loudspeaker.

According to a further advantageous design of the invention it is provided that in case the switch is actuated, the microphone and/or the loudspeaker can be switched on and at the same time the headset microphone and/or the headset loudspeaker can be switched off. This offers the possibility to ensure that e.g. when the operator has a break only the microphone and the loudspeaker are active, whilst the headset microphone and the headset loudspeaker are switched off.

According to an advantageous variant of the invention it may moreover be provided that by means of a configuration of the belt pack it is provided that a certain subscriber of the intercom network or a number of users of the intercom network are addressed via the duplex line of the headset, and that another or a certain user or a number of other certain users of the intercom network are addressed via the loudspeaker and the microphone. Insofar this offers the possibility of generating different communication paths or communication groups.

Furthermore according to the invention provision may be made that for a mode of operation or a type of configuration of the belt pack according to the invention only the loudspeaker for example is active, whilst the microphone is inactive. With this variant the operator can for example, during a break, listen for a certain signal warning him not to miss his return to duty.

According to a further advantageous design of the invention an automatic response of the switch occurs while a link is established between headset and port.

According to one variant of the invention the belt pack may be provided in particular with a detection means that detects whether a headset is momentarily connected to the belt pack. Such a detection means may for example comprise a micro-switch or another suitable electronic means in the region of the port that is automatically actuated when the headset-side plug is plugged into the port on the belt pack formed as a socket.

According to a further advantageous design of the invention at least one annunciator is provided on the housing that signals a functional condition of the microphone and/or a functional condition of the loudspeaker. The annunciator may be implemented for example in an optical manner, for example with the aid of LEDs or similar light sources and may indicate to the operator the functional condition or alternatively the configuration condition of the microphone and/or the loudspeaker.

Such an annunciator may be optionally effected via a annunciator, for example an alpha-numerical display provided on the belt pack.

According to a further design of the invention at least one annunciator is provided on the housing that signals or indicates a switching state or a configuration state of a switch for the microphone and the loudspeaker.

According to a further advantageous design of the invention a configuration means is provided on the housing, with which the microphone and/or the loudspeaker and/or a switch for the microphone and the loudspeaker can be configured. Such a configuration means may for example comprise programmable keys which can be actuated by an operator.

According to a further advantageous design of the invention the communication module is provided to provide a radio link with other users of the intercom network. This can be accomplished using conventional communication modules of mobile terminals, i.e. belt packs.

According to a further advantageous design of the invention the radio link is designed in accordance with the DECT standard. This makes it possible to fall back on known commonly used radio protocols.

According to a further advantageous design of the invention a fastener is provided on the housing with which the belt pack can be attached to a belt of an operator. This permits the use of a belt pack according to the invention in the conventional manner.

According to a further advantageous design of the invention the port for the headset is configured as a socket for receiving an XLR plug, in particular an XLR-female 4-pole-plug.

BRIEF DESCRIPTION OF THE DRAWING

Further advantages of the invention are revealed in the sub-claims not cited as well as in the description hereunder of the embodiments depicted in the figures, in which

SPECIFIC DESCRIPTION OF THE INVENTION

Figure 1:
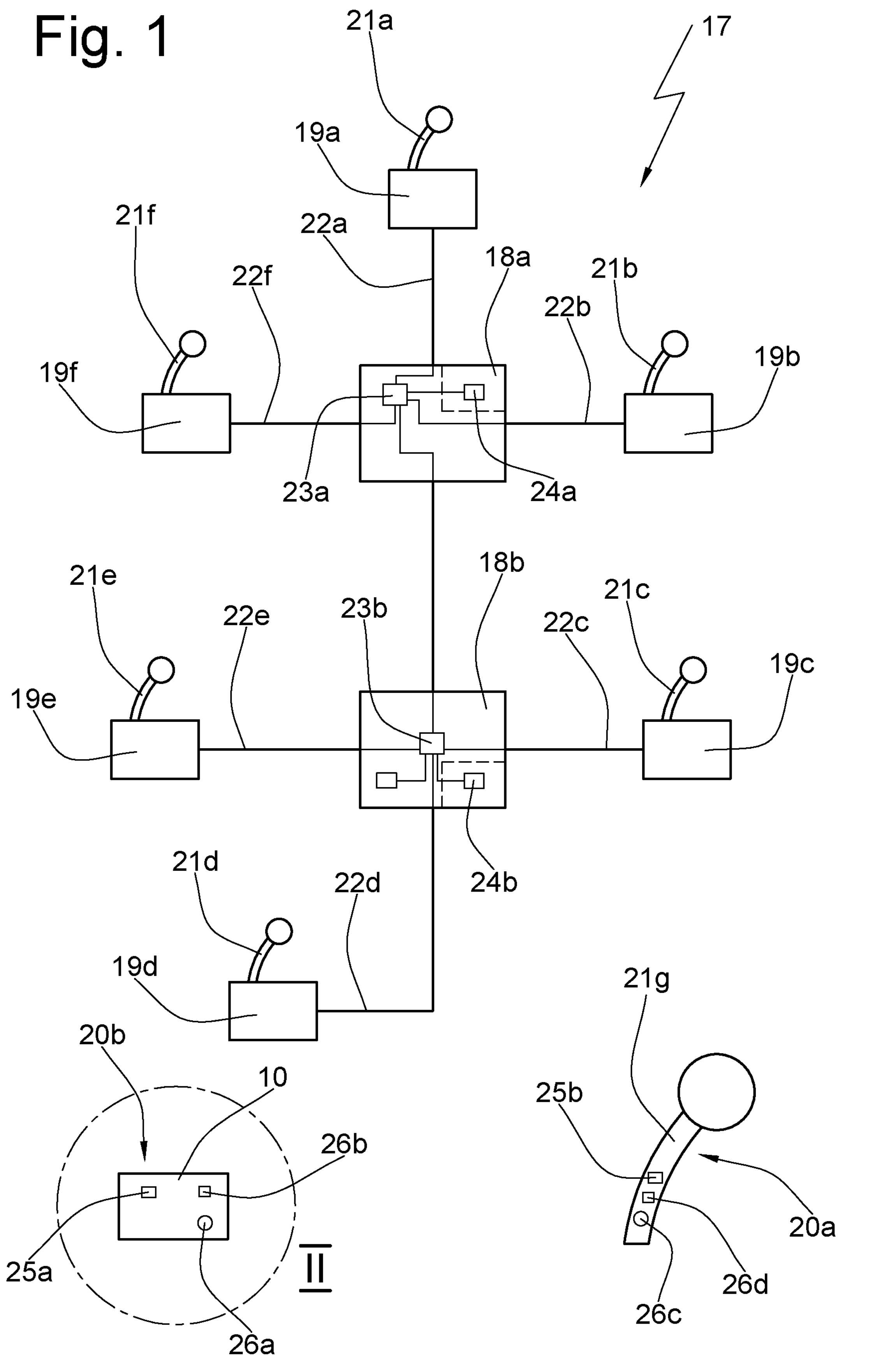
FIG. 1 is a schematic view laid-out as a block diagram of an intercom network that depicts a mobile terminal according to an embodiment of the invention.

In the description of the figures hereunder embodiments of the invention have been described by way of example and with reference to the drawings. For clarity's sake, also insofar has different embodiments are concerned, identical or comparable parts or elements or areas have been denoted with identical reference symbols, sometimes with the addition of lower-case letters.

Features described with reference to only one embodiment may also, in terms of the invention, be provided in any other embodiment of the invention. Embodiments are covered by the invention, even if they are not depicted in the drawings.

All features disclosed are on their own essential to the invention. Included in the disclosure of the application is the full disclosure content of the associated priority documents (copy of the preliminary application) and of the cited publications and the described devices of the state of the art, also for the purpose of including individual or several features of these documents in a single claim or in several claims of the present application.

The mobile terminal or belt pack according to the invention is depicted by way of an embodiment and is denoted in the drawing in its entirety with 10.

Figure 2:
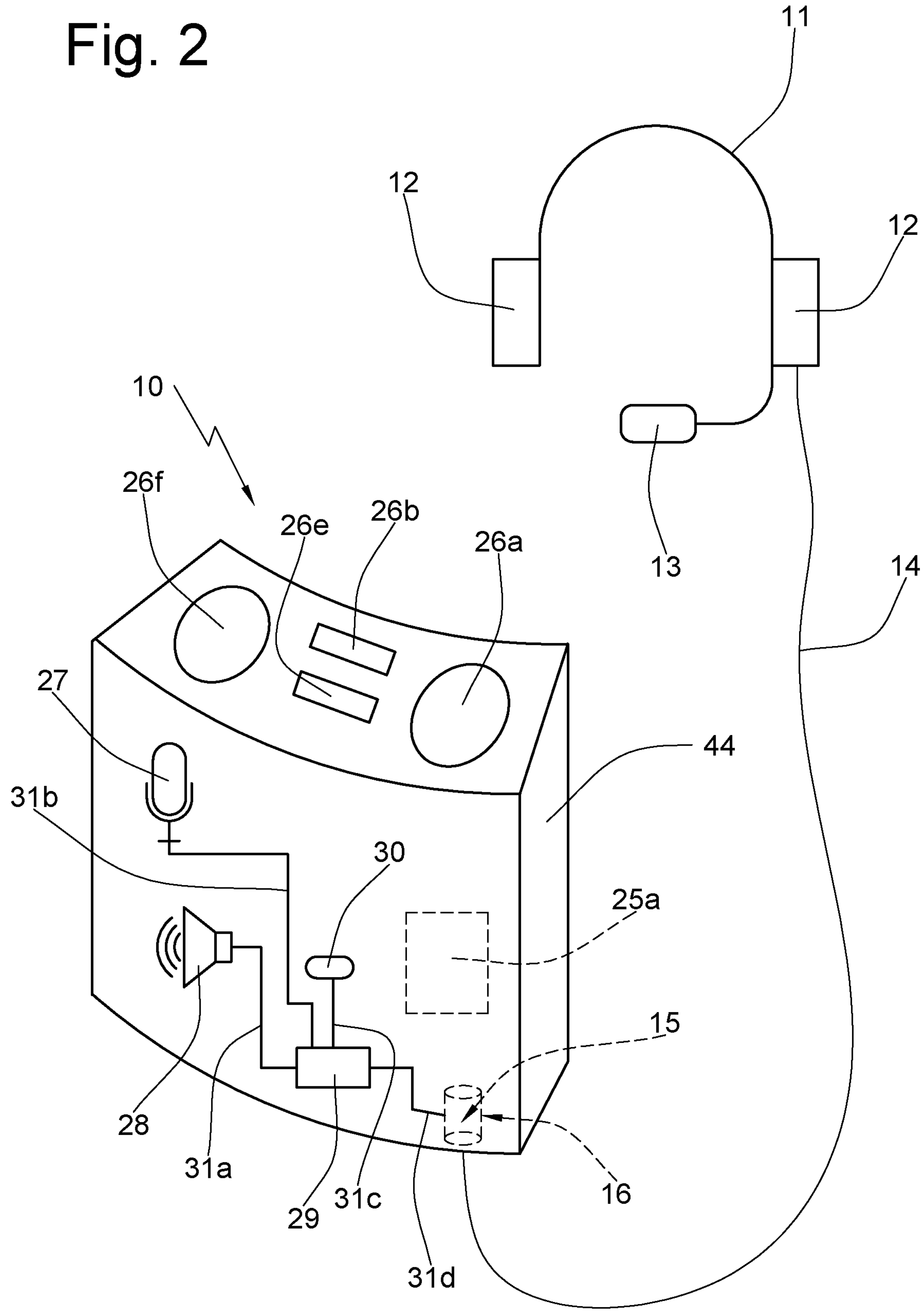
FIG. 2 is an enlarged schematic perspective individual depiction of an embodiment of the inventive belt pack as per FIG. 1 with an additionally connected schematically shown headset.
Figure 3:
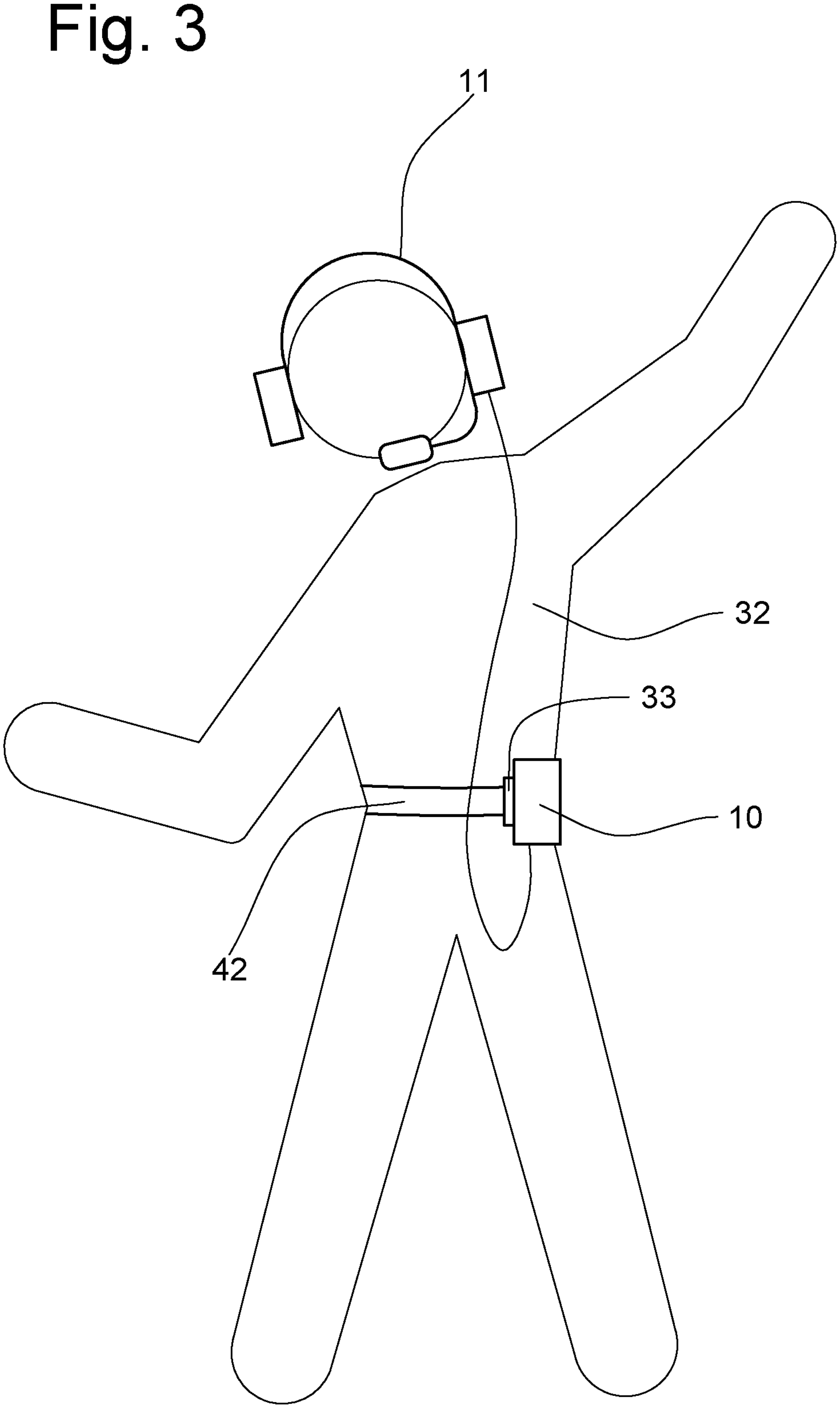
FIG. 3 is a schematic view of an operator carrying an inventive belt pack.
Figure 4:
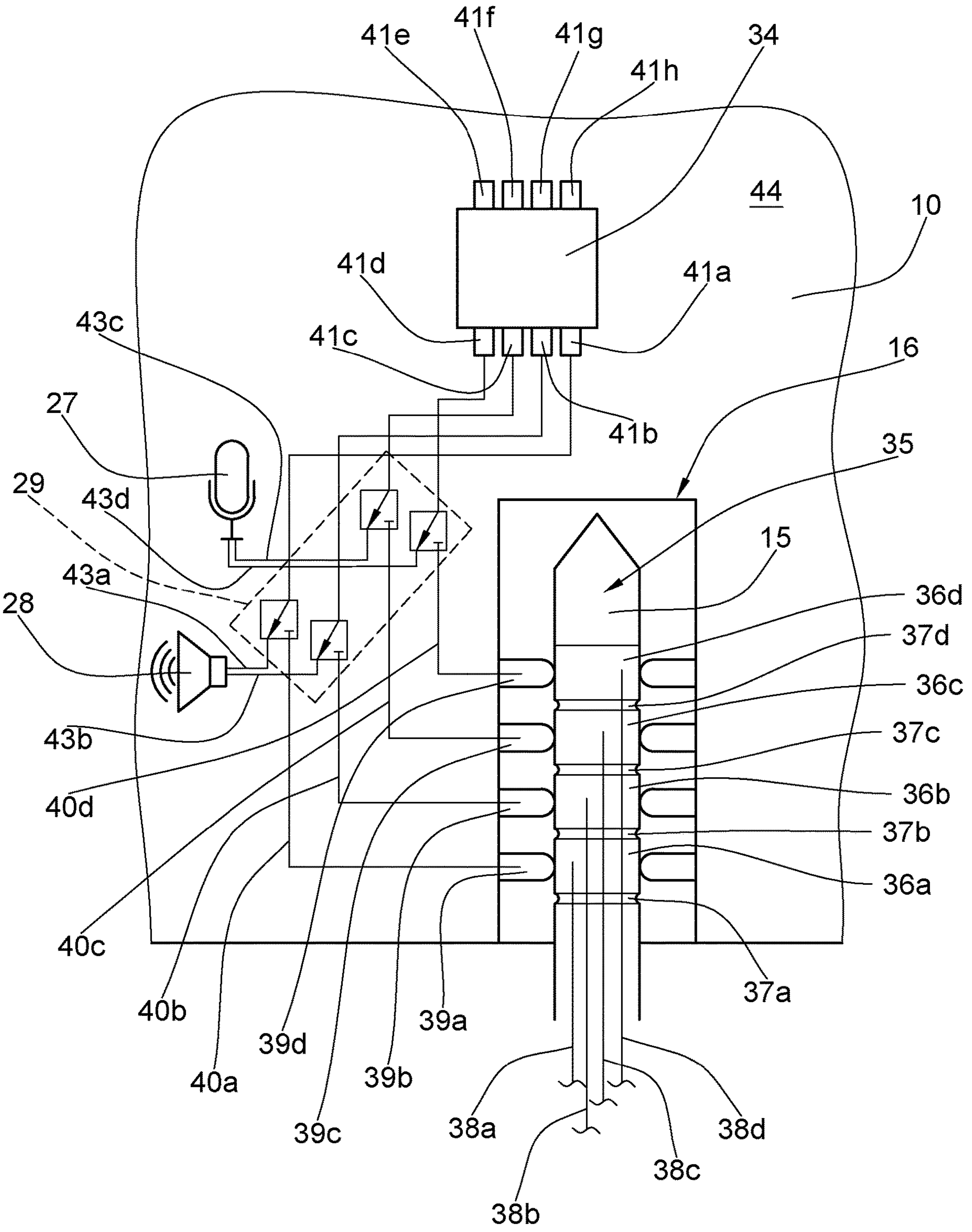
FIG. 4 is a schematic partly sectional view of a cut-out area of the belt pack of FIG. 2 in the area of the port for the headset.

According to FIG. 2 the belt pack, as revealed in the perspective view of FIG. 2, is a cuboid shaped body with a housing 44 to which a headset 11 can be connected. A headset 11 traditionally includes a headset loudspeaker 12 and a headset microphone 13. The headset 11 is connected to the belt pack 10 via a connecting line 14. A plug 15 is attached to the free end of the connecting line 14. In the embodiment of FIG. 4 the plug 15 is configured as a jack plug 35. With other embodiments covered by the invention the plug is configured for example as an XLR female plug, in particular as a 4-pole plug.

The headset 11 makes a duplex operation possible, i.e. the user of the headset 11 can listen and talk at the same time. This requires two separate line pairs so that the connecting line 14 in total comprises at least four electrical lines.

To receive the plug 15 the belt pack comprises a port 16 which in the embodiment is configured as a socket. The socket serves to receive the plug 15.

The belt pack 10 is a mobile terminal that is used in an intercom network. In FIG. 1 such an intercom network is denoted in its entirety with 17 and will now be explained as follows:

An intercom network 17 in terms of the present patent application may for example have one or more stationary users 19. The stationary users in FIG. 1 are denoted with 19*a*, 19*b*, 19*c*, 19*d*, 19*e*, 19*f*.

The stationary users are also called intercom stations. Each station comprises a microphone (see microphones 21, 21*b*, 21*c*, 21*d*, 21*e*, 21*f*) and a loudspeaker which is not depicted.

Each of the intercom stations 19*a*, 19*b*, 19*c*, 19*d*, 19*e*, 19*f* is connected to a switching center 18*a*, 18*b* via its own connecting line 22*a*, 22*b*, 22*c*, 22*d*, 22*e*, 22*f*. Two switching centers 18*a*, 18*b* are provided in the embodiment in FIG. 1. Covered by the invention are intercom networks 17 that comprise one or more switching centers 18, 18*a*, 18*b*.

Each of the switching centers 18*a*, 18*b* comprises its own control unit 23*a*, 23*b*. This is where in particular the address paths are managed in order to ensure that each user (e.g. 19*a*) can establish a desired direct audio-speech connection with a certain desired other user (e.g. 19*b*). Such a direct audio connection between two intercom stations 19*a*, 19*b* is obtained by an appropriate configuration of keys (not shown in FIG. 1) at the intercom stations.

Also each of the two switching centers 18*a*, 18*b* includes a communication module 24*a*, 24*b*. Via this communication module 24*a*, 24*b* audio signals can be transmitted to mobile terminals 20*a*, 20*b*. In FIG. 1 the mobile terminal 20*b* is schematically shown as a belt pack. In the embodiment of FIG. 1 the mobile terminal 20*b* is depicted as a mobile microphone 21*g*.

Each of the mobile terminals 20*a*, 20*b* has a respective communication module 25*a*, 25*b* provided on it that can establish a radio link to the communication module 24*a*, 24*b* at the switching center 18*a*, 18*b*.

It should be noted that the invention also covers the case where the mobile terminals 20*a*, 20*b* enter into a radio link also with other users of the intercom network 17, even with users not shown.

In particular, according to the invention a bidirectional radio link is possible between the mobile terminals 20*a*, 20*b* via the communication modules 25*a*, 25*b* with the communication modules 24*a*, 24*b* at the switching centers.

A plurality of configurable keys or switches 26*a*, 26*b*, 26*c*, 26*d*, 26*e*, 26*f* is provided at the stationary users, the intercom stations 19*a*, 19*b*, 19*c*, 19*d*, 19*e*, 19*f* as well as at the mobile terminals 20*a*, 20*b*. These keys can be used for setting numerous functions. As such the keys can be configured for example as speed dial keys in order to ensure a direct audio connection to a certain user when actuating a key.

In other respects, in order to avoid repetitions, reference is made to the applicant's older German patent applications mentioned in the beginning.

Referring to FIG. 2 the special features according to the invention are explained by way of the embodiment of the inventive belt pack 10. The expert will be aware here that the remaining components and functions of the traditional belt pack, even if these have not been described in the context of the embodiment of FIG. 2, may all the same be present in belt packs according to the invention.

It is therefore pointed out in particular that there is no depiction of the electronic components that are required in order to convert into electronic signals the signals received from the belt pack 10 via the headset microphone 13 and emitted via the communication module 25. Similarly, FIG. 2 does not show the necessary electronic components that are usually provided in order to convert into electronic signals the audio signals that are received from the communication module 25*a* via a radio link in order to pass these to the loudspeakers 12 of the headset 11.

Such components are known to the expert and are naturally present in the inventive belt pack 10 as per FIG. 2.

As shown in FIG. 2 a microphone 27 and a loudspeaker 28 are provided on the housing 44 of the belt pack 10. The microphone 27 is connected via a connecting line 31*b* and the loudspeaker 28 is connected via a connecting line 31*a* to the symbolically indicated switch 29. With the embodiment in FIG. 2 the switch 29 is configured as a switch that can be actuated by an operator. With further embodiments covered by the invention but not shown in the drawings the switch 29 is a logical switch which can be actuated via a configuration or setting, for example by actuating one of the settings keys 26*a*, 26*b*, 26*e* or 26*f* on the belt pack.

The switch 29 is moreover connected with an annunciator 30. The annunciator 30 can indicate to the operator a switch state. Alternatively the annunciator 30 can indicate to an operator a functional condition or a configuration state of the loudspeaker 28 or the microphone 27.

The annunciator 30 may also be provided by a display that is not shown in FIG. 2. The invention also covers e.g. embodiments of belt packs which comprise a display, in particular a display on the top of the belt pack 10.

According to FIG. 2 the switch 29 is connected via a connecting line 31*d* only schematically indicated to the port 16. Alternatively it may be provided but is not shown in FIGS. 2 and 4, that the switch 29 is connected via a control or switching line to a central control unit of the belt pack 10, e.g. to a microprocessor 34 (FIG. 4).

The switch 29 may, moreover, be connected to the annunciator 30 via a connecting line 31*c*.

According to FIG. 2 the operator 32 can fasten the belt pack 10 to, for example, the belt 42 with the aid of a fastener 33. Fasteners of a different kind not shown in the figures are also covered by the invention.

According to FIG. 4 the port 16 may e.g. be configured as a socket for receiving a jack plug 35. The jack plug 35 may provide the free end of the connecting line 14 of the headset 11.

In order to provide a duplex audio-speech connection via the headset 11, the connecting line 14 comprises at least four conductors 38*a*, 38*b*, 38*c*, 38*d*. Correspondingly the jack plug 35 comprises four contacting sections 36*a*, 36*b*, 36*c*, 36*d* that are electrically separated from each other by the insulating portions 37*a*, 37*b*, 37*c*, 37*d*.

The socket 16 may, for example, be equipped with spring contacts 39*a*, 39*b*, 39*c*, 39*d* that after inserting the jack plug 35 into the socket 16 ensure an electrical contact of the contacting sections 36*a*, 36*b*, 36*c*, 36*d* and in this way establish an electrical contact between the connecting lines 40*a*, 40*b*, 40*c*, 40*d* and the conductors 38*a*, 38*b*, 38*c*, 38*d*.

At this point it should be mentioned that in many cases of applications the headset 11, at the free end of the connecting line 14, does not have a jack plug 35 but an XLR plug, in particular a 4-pole XLR plug with the socket providing the corresponding counter contacts. The invention in particular also covers the use of contact pins instead of spring contacts 39*a*, 39*b*, 39*c*, 39*d*.

According to the embodiment in FIG. 4 the belt pack 10 comprises a control unit that for example, as schematically shown, is implemented as a microprocessor. The microprocessor may comprise a plurality of connection contacts 41*a*, 41*b*, 41*c*, 41*d*, 41*e*, 41*f*, 41*g*, 41*h*.

Assuming that the spring contacts 39*a*, 39*b*, 39*c*, 39*d* are connected via the connecting lines 40*a*, 40*b*, 40*c*, 40*d* to the connection contacts 41*a*, 41*b*, 41*c*, 41*d* on the microprocessor 34, the schematically shown switch 29 in FIG. 4 can be used to explain, how the microphone 27 and the loudspeaker 28 may be connected.

According to the embodiment of FIG. 4 the switch 29 is thus designed such that it connects the connection contacts 41, 41*b*, 41*c*, 41 on the microprocessor 34 either to the spring contacts 39*a*, 39*b*, 39*c*, 39*d* or to the line branches 43*a*, 43*b*, 43*c*, 43*d*. Following actuation of the switch 29 the microprocessor 34 is therefore connected either to the loudspeaker 28 and the microphone 27, or to the headset 11 with headset microphone 13 and headset loudspeaker 12.

FIG. 4 shows the switch position of the switch 29, in which the connection between microprocessor 34 and headset 11 is disconnected and the connection between microprocessor 34 and loudspeaker 28 and microphone 27 is closed.

In another switch position of the switch 29, which is not shown, the microprocessor 34 would be connected to the headset 11 and the connection between microprocessor 3$ and loudspeaker 29 and microphone 27 would be disconnected.

This variant is however only one possible design of the invention.

According to another variant it may be provided that the line branches 43*a*, 43*b*, 43*c*, 43*d* are connected in parallel to the connecting lines 40*a*, 40*b*, 40*c*, 40*d* and the switch 29 merely ensures that these line branches 43*a*, 43*b*, 43*c*, 43*d* are opened or interrupted. According to this variant the microphone-loudspeaker combination could be connected or disconnected at the belt pack 10 without adversely affecting the connection between microprocessor 34 and headset 11.

With a further design of the invention actuation of the switch 29 by an operator is not possible or not only manually possible, but the switch may be actuated via a central control unit 34 of the belt pack 10. To this end the switch 29 may for example be connected to the microprocessor 34 via a control line not shown in FIG. 4. Or respective connection contacts with connecting lines running to the loudspeaker 28 and microphone 27 may be provided directly on the microprocessor 34, wherein switching of these line paths may take place within the microprocessor 34.

It should be mentioned in this context that the microprocessor 34 in the embodiment of FIG. 4 is meant to merely symbolically indicate a control logic and an intelligence or a control electronics of the belt pack 10.

In particular, as not shown FIG. 4, this control logic 34 is connected to the communication module 25*a* in a manner not shown, in order to convert the audio information to be transmitted via the conductors 40*a*, 40*b*, 40*c*, 40*d*, 39*a*, 39*b*, 39*c*, 39*d* into electrical signals that can be transmitted by radio.

Further it should be mentioned at this point that FIG. 4 does not show that the microprocessor 34/the control logic is connected to the programmable or configurable keys and elements 26*a*, 26*b*, 26*e*, 26*f* of the belt pack 10 as per FIG. 2. By means of an actuation of these elements 26*a*, 26*b*, 26*e*, 26*f* the switch 29 and/or the loudspeaker 28 and the microphone 27 can be configured in an appropriate manner.

Furthermore it should be mentioned at this point that a detection device not shown in FIG. 4 can detect the presence of a plug 15 in the socket 16. Such a detection device akin to a presence sensor may for example be a contact switch which is immovably mounted on the socket side and is actuated or triggered when a plug 15 is inserted into the socket. Such a switch may for example also be connected to the control logic 34 and signal to the control logic 34 the presence of a plug and thereby a connected headset 11. In response to such a message the control intelligence 34 may, as required, effect a corresponding actuation of the switch 29.

The invention claimed is:

1. In combination with a headset having an XLR plug, a headset microphone, and a headset loudspeaker, a mobile terminal portable by a user and configured for use in an intercom network, the mobile terminal comprising:

a housing having a top face, a bottom face, a back face, and a front face larger than the top face;

an XLR port on the bottom face for the XLR plug of the headset;

a communication module in the housing for wirelessly transmitting audio information to other users of the intercom network;

a plurality of programmable operating elements on the top face actuatable for providing direct audio connection to respective selected users of the intercom network;

a housing microphone and a housing loudspeaker in or on the housing;

at least one switch on the top face of the housing operable for switching the housing microphone on or off and for switching the housing loudspeaker on or off independently of the housing microphone; and at least one display on the top face of the housing for displaying a switching state of the housing microphone or of the housing loudspeaker.

2. The combination according to claim 1, wherein the switch in or on the housing can, when actuated by an operator, switch the housing microphone and/or the housing loudspeaker on or off.

3. The combination according to claim 2, wherein actuation of the switch switches on the housing microphone and/or the housing loudspeaker and at the same time switches off the headset microphone and/or headset loudspeaker.

4. The combination according to claim 2, wherein, when a connection is made between the XLR plug of the headset and the XLR port, the switch is automatically actuated to switch on the headset microphone and headset loudspeaker.

5. The combination according to claim 1, wherein the communication module is configured to provide a radio link to other users of the intercom network.

6. The combination according to claim 5, wherein the radio link is designed in accordance with the DECT standard.

7. The combination according to claim 1, further comprising:

a fastener on the housing for securing the belt pack to a belt of the user of the belt pack with the top face direct upward and the front face directed outward away from the user of the belt pack.

8. A mobile terminal in the form of a belt pack portable by a user and configured for use in an intercom network with a headset having a headset microphone, a headset loudspeaker, and an XLR plug, the mobile terminal comprising:

a cuboidal housing having a top face and a bottom face;

an XLR port on the bottom face of the housing for receiving the XLR plug of the headset;

a communication module inside the housing for wirelessly transmitting audio information to other users of the intercom network;

a plurality of programmable operating elements on the top face of the housing and actuatable for providing direct audio connection to respective selected other users of the intercom network;

a housing microphone and a housing loudspeaker in or on the housing for communication by a user of the mobile terminal with the other users of the intercom network;

at least one switch on the top face of the housing and operable to activate or deactivate the housing microphone and to activate or deactivate the housing loudspeaker independently of the housing microphone; and at least one annunciator on the top face of the housing for indicating a switching state of the housing microphone and/or of the housing loudspeaker.

9. A mobile terminal portable by a user and configured as a belt pack for use in an intercom network with a headset having an XLR plug, a headset microphone, and a headset loudspeaker, the mobile terminal comprising:

a housing having a top face and a bottom face;

an XLR port on the bottom face of the housing for the XLR plug of the headset;

a communication module in the housing for wirelessly transmitting audio information to other users of the intercom network;

a plurality of programmable operating elements on the top face of the housing and actuatable for providing direct audio connection to respective selected users of the intercom;

a housing microphone and a housing loudspeaker in or on the housing;

switch means on the top face of the housing for providing at least the following different selectable operation modes:

a first operation mode in which the headset microphone and the headset loudspeaker are active and the housing microphone and the housing loudspeaker are inactive, a second operation mode in which the headset microphone and the headset loudspeaker are inactive, the housing loudspeaker is active and the housing microphone is inactive, and a third operation mode in which the headset microphone and the headset loudspeaker are inactive and the housing loudspeaker and the housing microphone are active; and an annunciator on the housing for indicating a switching state of the housing microphone and/or of the housing loudspeaker.

10. The combination according to in claim 1, wherein the belt pack comprises a plurality of programmable selection switches for direct audio communication with another participant of the intercom network.

11. The combination according to claim 5, wherein the radio link uses the DECT protocol.

12. The combination according to claim 4, wherein the switch means automatically switches on or off when the housing microphone and the housing loudspeaker are connected with the XLR plug to the belt pack.

13. The combination according to claim 1, further comprising means for detecting connection of a headset to the belt pack, the XLR port on the belt pack being configured to receive an XLR female plug of a headset.

* * * * *